Figure 1:
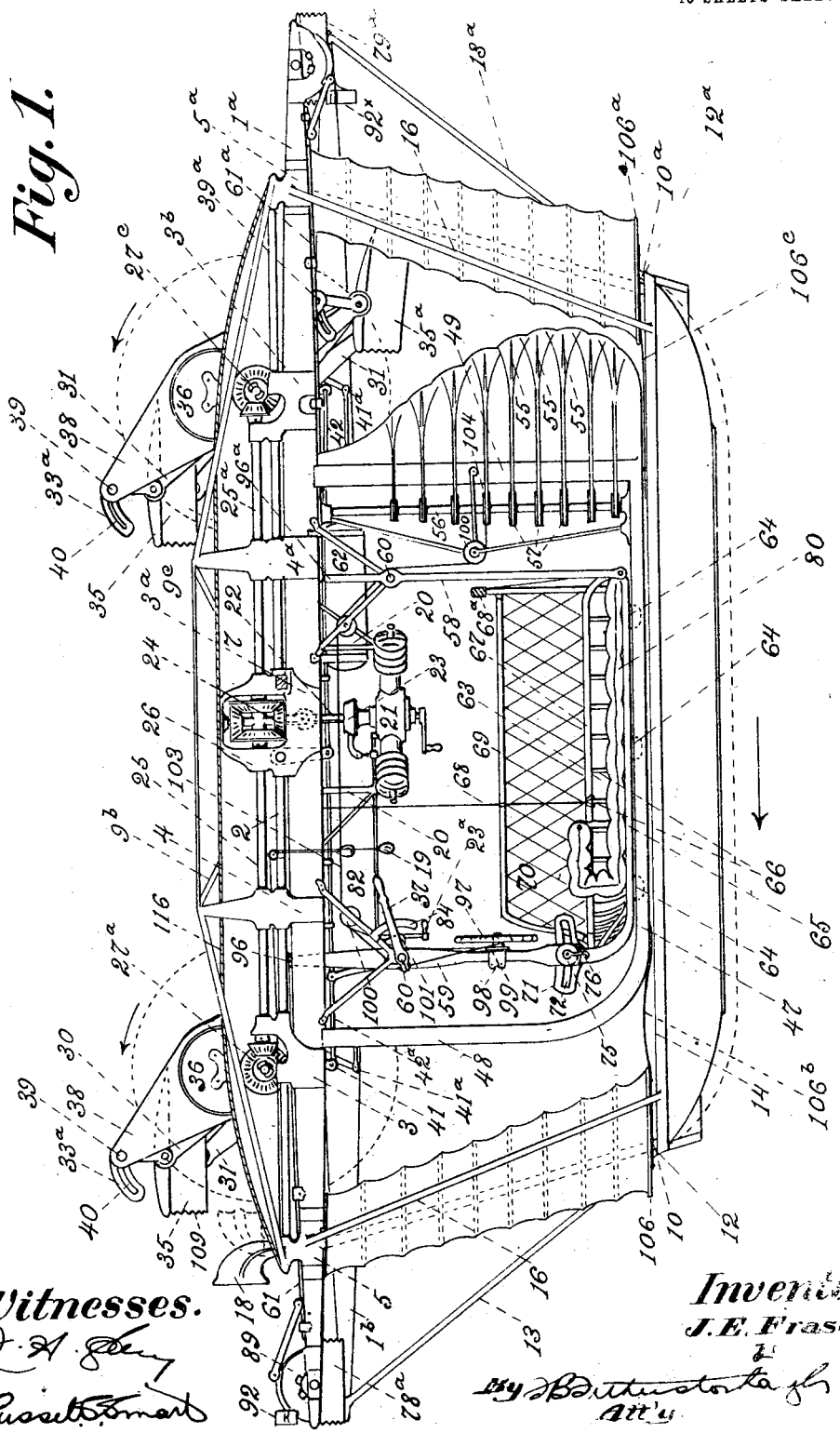

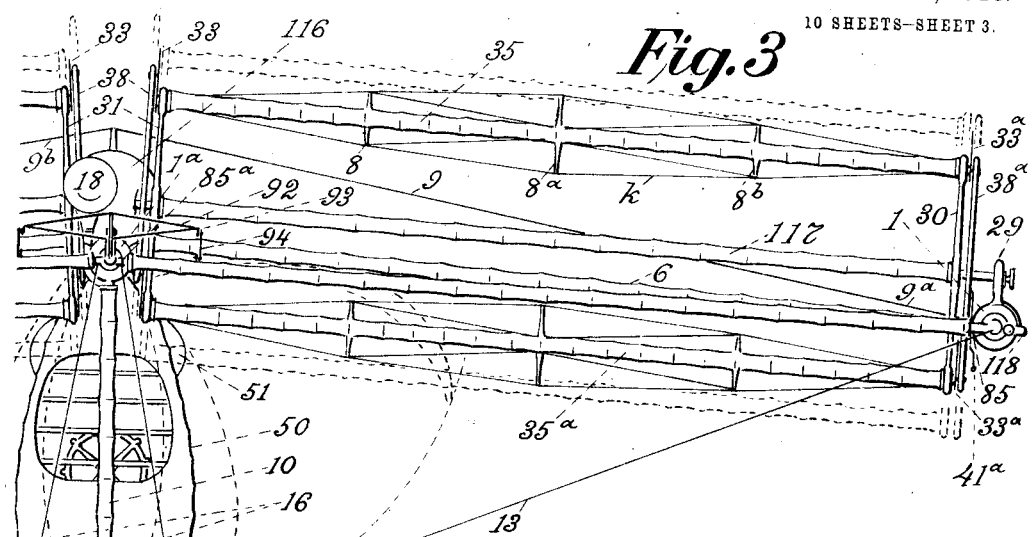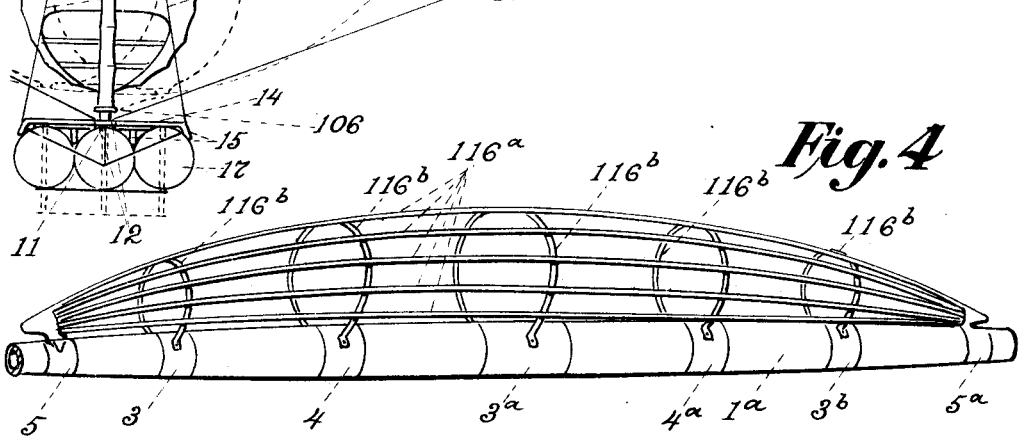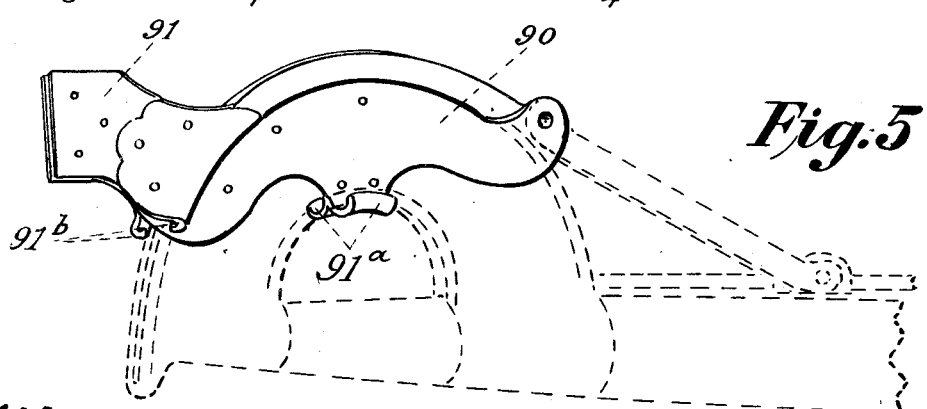

J. E. FRASER.
AERIAL VEHICLE.
APPLICATION FILED AUG. 31, 1908.

1,075,969.

Patented Oct. 14, 1913.
10 SHEETS—SHEET 4.

Witnesses.

Inventor.
J. E. Fraser.
By
Att'y.

J. E. FRASER.
AERIAL VEHICLE.
APPLICATION FILED AUG. 31, 1908.
1,075,969.
Patented Oct. 14, 1913.
10 SHEETS—SHEET 5.
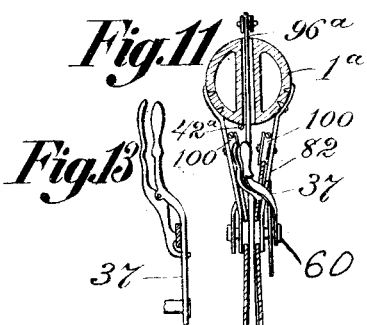
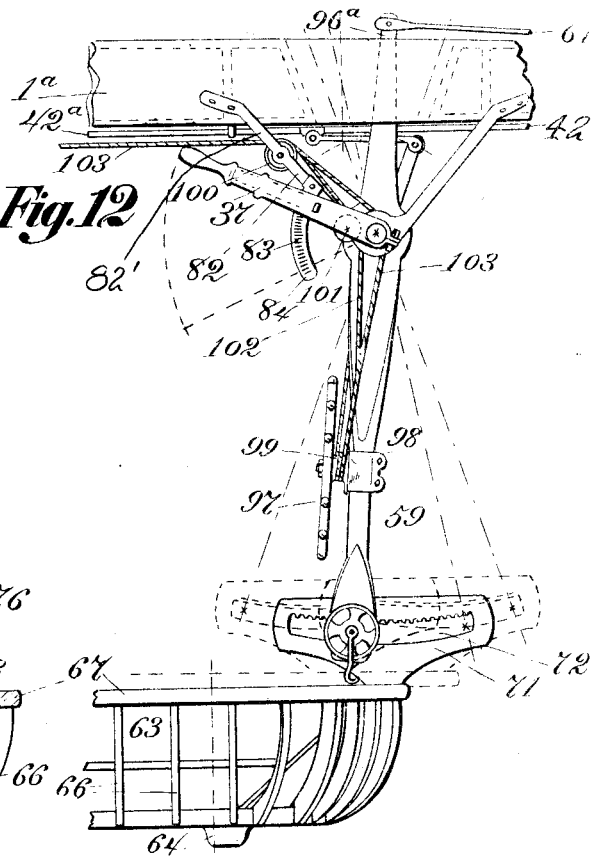

J. E. FRASER.
AERIAL VEHICLE.
APPLICATION FILED AUG. 31, 1908.
1,075,969.
Patented Oct. 14, 1913.
10 SHEETS—SHEET 6.
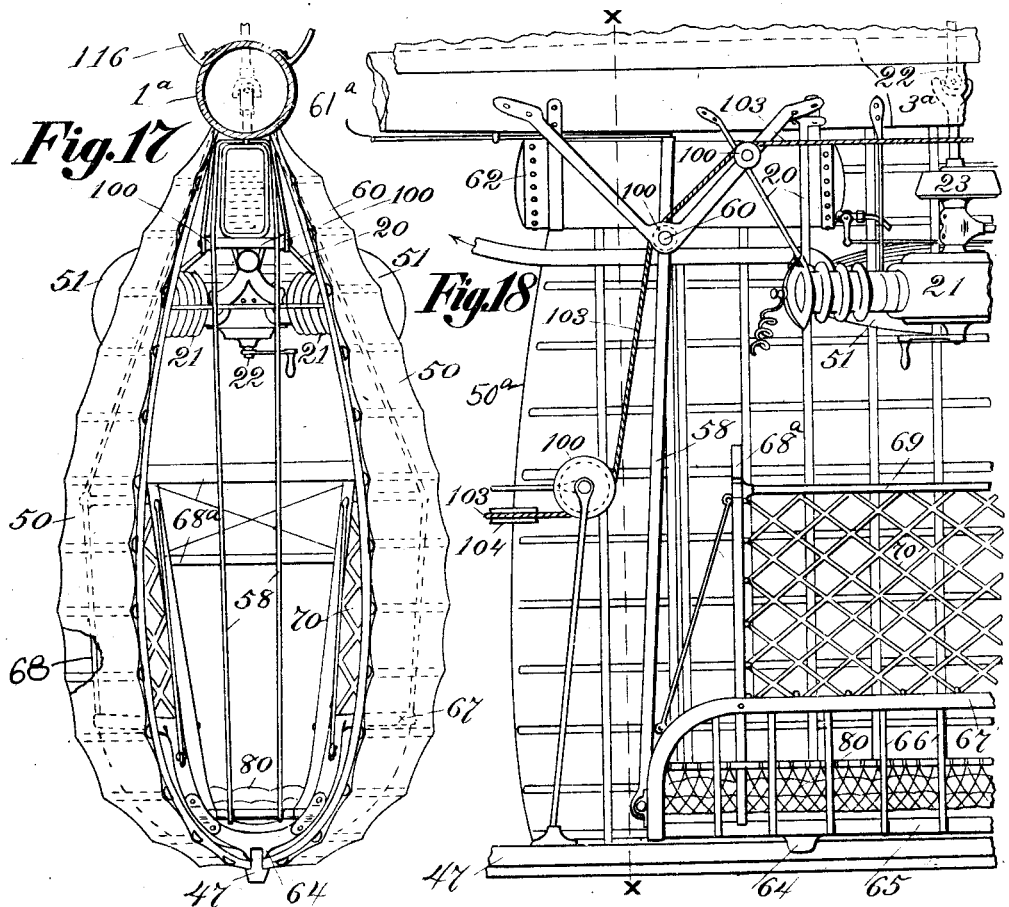

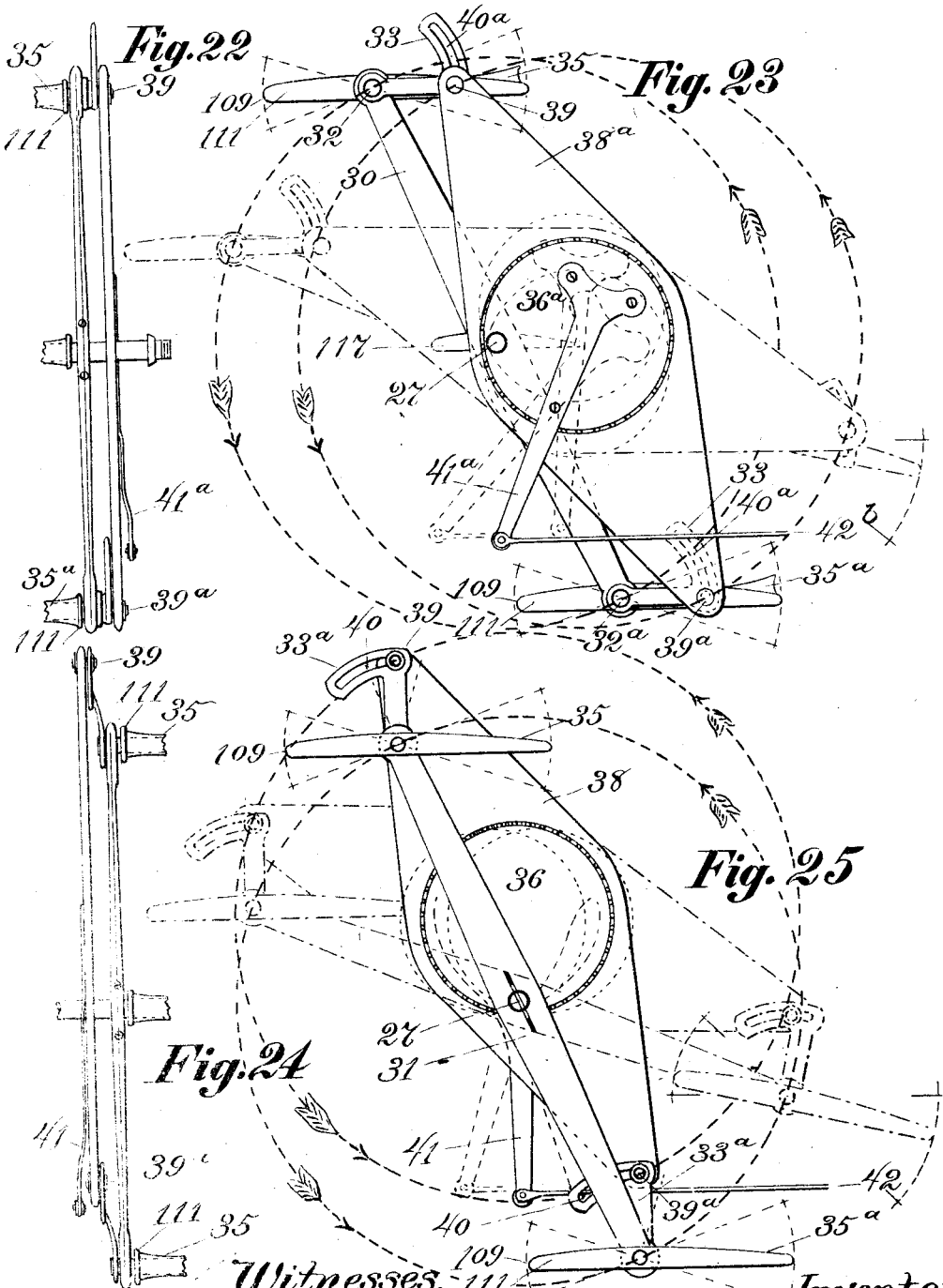

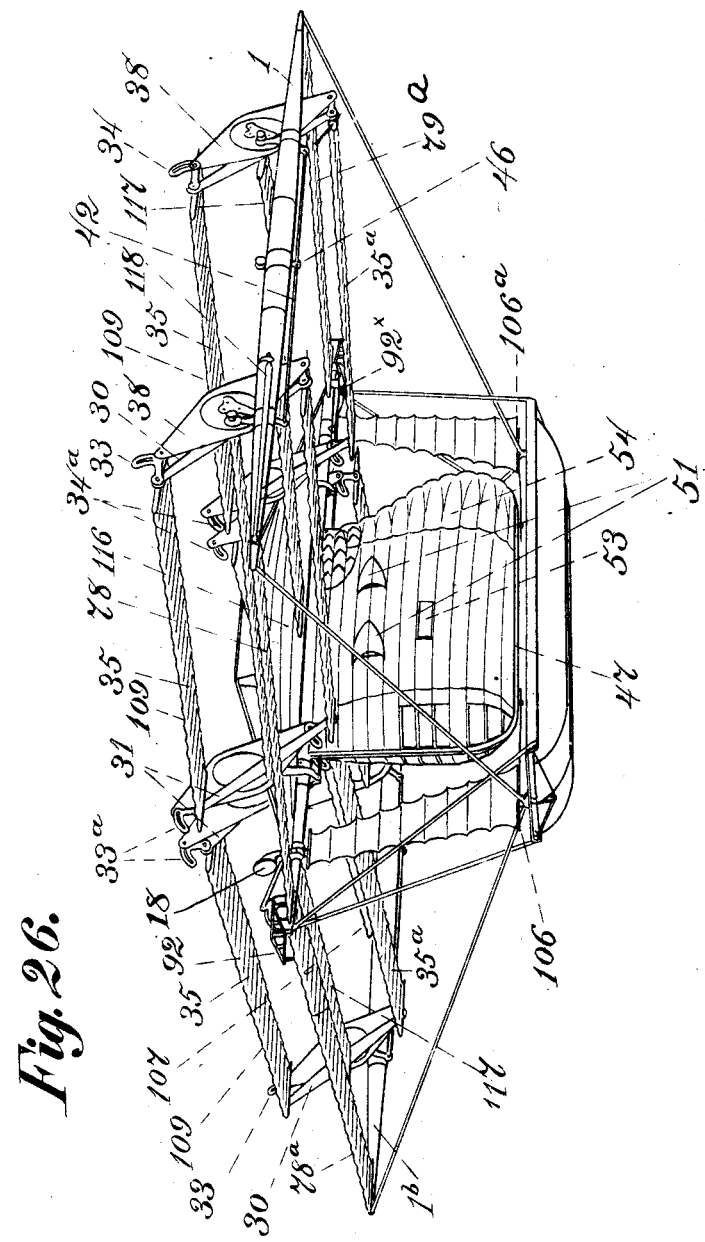

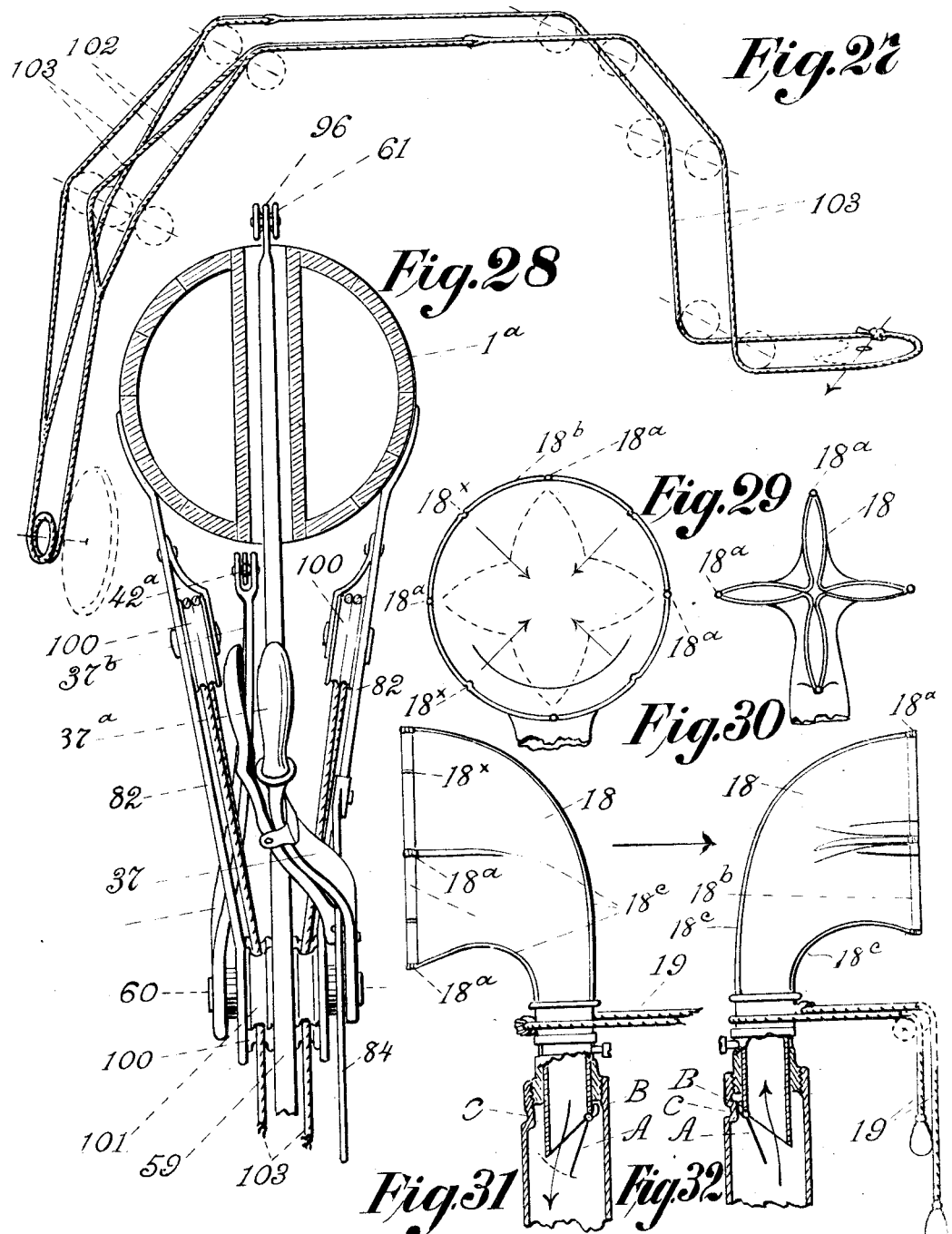

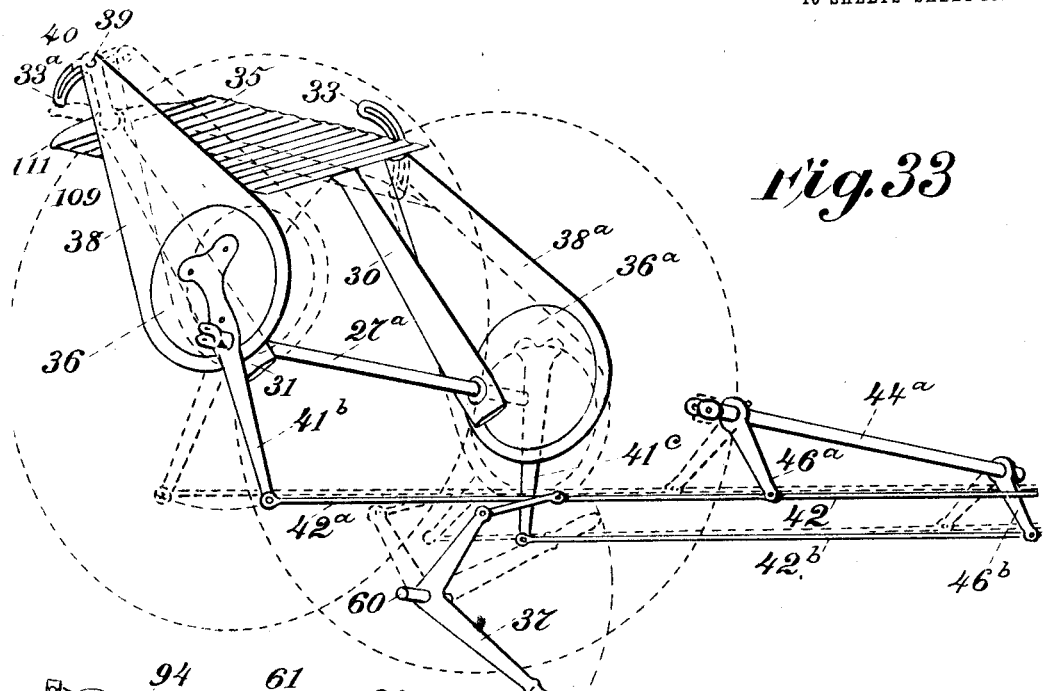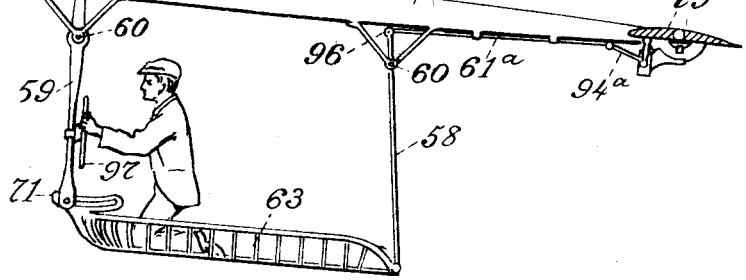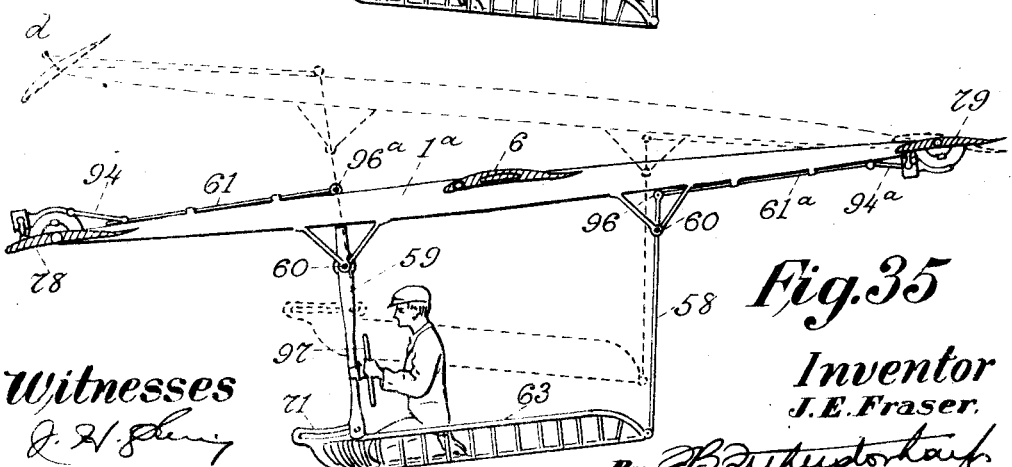

UNITED STATES PATENT OFFICE.

JAMES EDWARD FRASER, OF ST. JOHN, NEW BRUNSWICK, CANADA.

AERIAL VEHICLE.

1,075,969.

Specification of Letters Patent. Patented Oct. 14, 1913.

Application filed August 31, 1908. Serial No. 451,043.

*To all whom it may concern:*

Be it known that I, JAMES EDWARD FRASER, of the city of St. John, in the county of St. John, in the Province of New Brunswick, Canada, engraver, having invented certain new and useful Improvements in Aerial Vehicles, do hereby declare that the following is a full, clear, and exact description of the same.

My invention relates to improvements in aerial vehicles in which dynamic effort, acting upon the atmosphere through specially designed mechanism, is the sole means used for aerial support and propulsion; and the objects of my improvement are, first, to produce a propelling mechanism readily adjustable at any time to vary the lifting versus the propelling tendency to any degree between certain limits; second, to produce an effective propelling mechanism moving at a moderate rate of speed; third, to provide a propelling mechansim that will grasp, compress and release the maximum quantity of free air consistent with the power expended, before said volume has time to yield except in its elastic capacity; fourth, to provide a lifting and propelling method independent of rolling or springing impulse at starting; fifth, to produce a propelling arrangement of wings directly available for gliding flight in the emergency of motor failure; sixth, to cause equilibrium in a moving machine to be subject to oppositely placed air deflectors controlled by a pendulous load; seventh, to provide means for automatically maintaining equilibrium; eighth, to provide automatic mechanical means to careen said machine toward a wind current when the machine is moving forwardly across said wind current; also by the same means, to cause said machine to careen inwardly when turning a curve; ninth, to provide a means for setting the machine to a constant angle of ascension or descension, or horizontal, and automatically maintaining said direction subject to the attendant's option; tenth, to reduce air resistance tending to retard the forward movement of the machine by virtue of the molded design of the same: eleventh, to protect passenger or operator from inclement elements by providing an enveloping shell or car; twelfth, to hermetically inclose enough space within said machine's component parts to render it floatable in water; thirteenth, to concentrate the upward and downward and lateral steering apparatus into one single instrument of guidance. I attain these objects by the mechanism illustrated in the accompanying drawings, in which—

Figure 2:
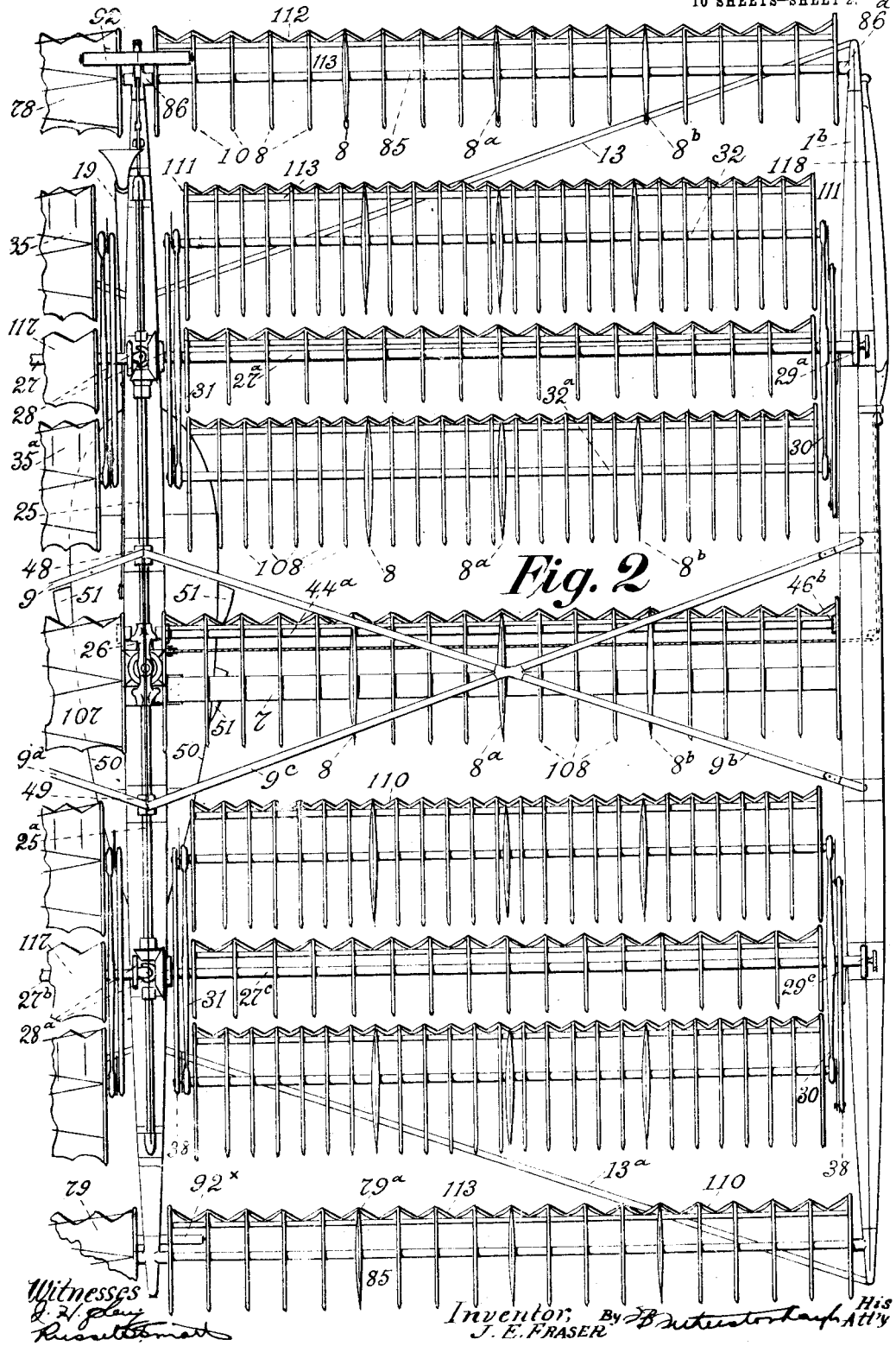
Figure 6:
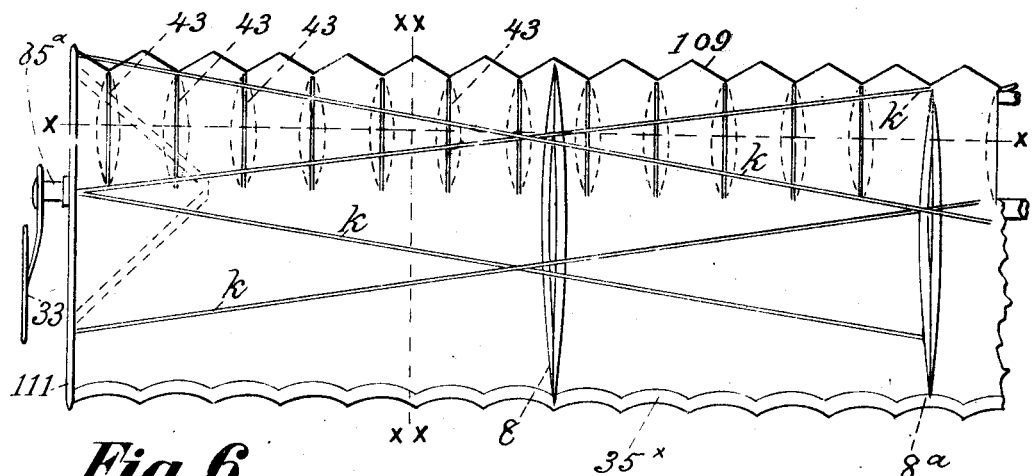
Figure 7:
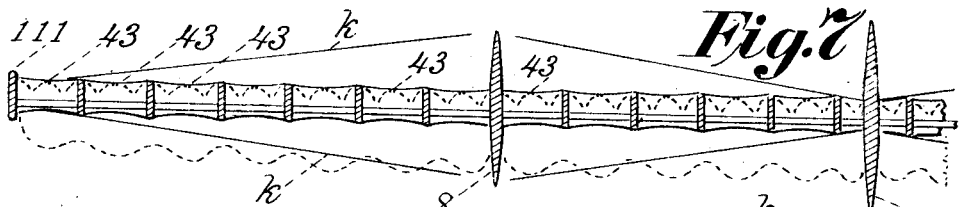
Figure 8:
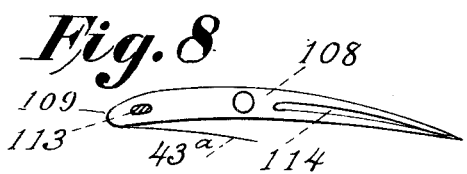
Figure 9:
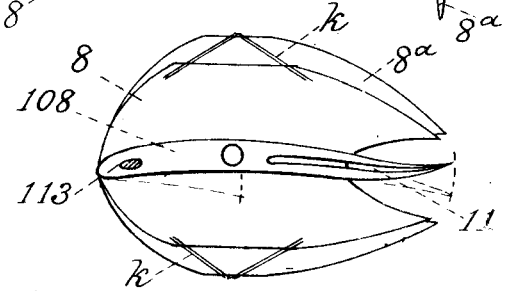
Figure 10:
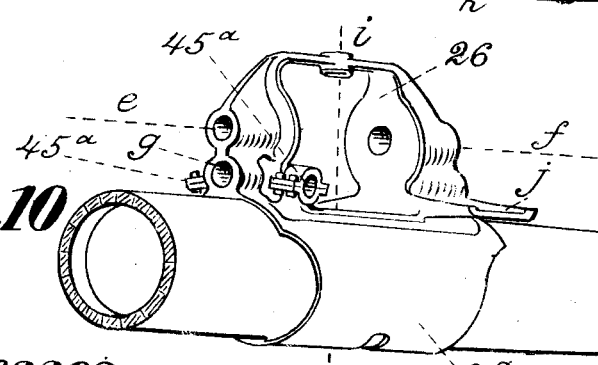

Figure 1 is a side view of the machine, the greater portion of the half nearest to the observer being removed to display the mechanism. Fig. 2 is a top view with the wing covering removed and the top housing removed or omitted to show the gear and shafting connections. Fig. 3 is a front view of the complete machine a little more than half being shown. Fig 4 illustrates the frame construction of housing for the mechanism carried on the central spar of the framing. Fig. 5 is an enlarged view of the sliding plate by means of which the guide vanes are tilted. Fig. 6 is a plan of a portion of the propeller wing showing slits on the forward portion to act as air escapes. The dotted lines indicate the extent of their opening. Fig. 7 is a longitudinal section of Fig. 6, viewed from a position forward of the broken line, $x$—$x$, the upper dotted lines indicating the position of the fabric with the orifices open, and the lower dotted line, the position of a flap that falls when its underside is relieved from a supporting air pressure from beneath. Fig. 8 is a side view of a wing rib. Fig. 9 is the same, illustrating the manner in which the rear portion yields and bends upwardly from the reactive force of the air borne upon, and also the struts used in trussing the wing are shown in position, as viewed looking to the right of dotted line $xx$—$xx$ on Fig. 6. Fig. 10 is a perspective view of the gear bridge. Fig. 11 is the inside of cradle front, viewed from the rear, showing support, arrangement for grading control, steering wheel and cord, and propeller deflecting lever. Fig. 12 is a side view of the same. Fig. 13 is an endgewise view of the propeller deflecting lever with stop lever attached and section of quadrant with stop lever enmeshed thereinto. Fig. 14 is a perspective view of the several parts comprising the clamping device, 75, enlarged, disconnected, but shown in proper serial order. Fig. 15 is a plan of rudder and steering connections with a horizontal section of the car shell inclosing the same. Fig. 16 is a fragmentary perspective view of the rudder mechanism. Fig. 17 is a view from the rear, cross sectional on line X—X, Fig. 18, looking into the car. Fig. 18 is a side view of the after part of the car interior and supporting spar. Fig. 19 is a front view of vane-tilting mechanism. Fig. 20 is a perspective view of the same. Fig. 21 is a side view of the same. Fig. 22 is a front view of propeller arms (outside pair.) Fig. 23 is an outside side view and diagram of propeller arms. Fig. 24 is a front view of inside pair of propeller arms. Fig. 25 is an outside side view of inside pair of propeller arms, diagrammatic. Fig. 26 is a perspective view of the complete vehicle. Fig. 27 is a view of the steering rope distinct from other parts but in operative position. Fig. 28 is an enlargement of the upper portion of Fig. 11 and showing the construction of the supporting spar in cross section. Fig. 29 is a front view of funnel distended as used for inflating the landing buffers. Fig. 30 is a front view of the same, collapsed. Fig. 31 is a side view of the preceding figure, the lower part showing its connection with the framework of the machine and also the check valve which closes from internal pressure. Fig. 32 is the same as the preceding figure but the funnel mouth is turned the reverse direction and in a collapsed condition. The lower part shows how in this position the check valve is prevented from closing, so that the air contained may find free egress. Fig. 33 shows in perspective all the basic essential parts in operative position relating to the propelling mechanism and means for adjusting it. Fig. 34 is a diagram of the vertical steering and longitudinal balancing mechanism, the figure being represented as directed upward. Fig. 35 represents the same mechanism directed downward, the dotted line indicating how this alteration is effected.

The main frame members of the machine comprise three hollow spars, 1, 1ª, 1ᵇ, longitudinally placed, their relative positions being parallel and equidistant, 1 and 1ᵇ occupying the outermost positions of any of the parts. These members are depended upon to resist the various bending and compression strains of trusses and ties that complete the standing frame or skeleton of the machine, and, for that reason, are made circular in cross section and gradually tapered from their full size at mid-length toward their extremities, which are pointed. Their material may be of light wood or metal or a combination of both. Diaphragms are placed at short intervals in their interior length as supports against collapse and also to render them cellular water floats should occasion require it.

The outermost spars, 1 and 1ᵇ, are rigidly and permanently secured in place. The central spar, 1ª, is free to oscillate in bearings that are connected and alined longitudinally by a dorsal tube, 2. The said spars are kept properly separated by spreaders 6 and 6ª. Each of the said spreaders is composed of a broad and thin wooden core, 7, which is trussed both on the upper and under sides by flat wire strained over thin, blade-like struts, 8, 8ª, 8ᵇ, placed edgewise to the air current. The outward ends of the strut cores are rigidly attached to the immovable members 1 and 1ᵇ; the inner ends, rigidly attached to lugs "$j$" on the central spar bearing 3ª. Other constructive parts are added and included in these spreaders as will hereafter be described herein. All transverse shafts act as additional compression members or spreaders.

The band bearings 4, 4ª, form the bases of vertical posts that act as the struts of a top system of trussing, the tension members of which, numbered 9, 9ª, 9ᵇ, 9ᶜ, connect in diagonal apposition with the outer spars 1 and 1ᵇ, the edgewise ties connecting with the extremities of the dorsal tube 2, and a strand coupling the upper extremities of the posts 4 and 4ª, together.

From the under side of each of the two bearings 5, 5ª, depends a cylindrical post or strut, 10, 10ª, each having an inclination toward the other, and a tie piece 14 which may be of wood or metal tubing, and which is rigidly fixed to the lower extremities of said posts, coupling them together. Ties of steel ribbon, 13, 13ª, extend from the forward and rearward extremities of the side frame members 1, 1ᵇ, to the lower frame angles, 12 and 12ª. The flat side of the said ribbon ties are positioned parallel with their line of air cleavage. In the drawing the tie piece 14 is represented by a tabular piece of wood rendered rigid by cleats 15 on the underside. Said tabular piece 14 is maintained in horizontal position by steel ties 16, which connect the corners of the said tabular piece with the bearings 5, 5ª. Three elongated casings of rubber fabric, 17, are attached to the underside of the said tabular piece 14, in the center of the spaces between the cleats 15, which said casings, when inflated with air, act as landing buffers or floats for the machine, as circumstances may require. Communication between the interior of said casings or tubes 17 and the outer air is maintained only through the post 10 and the swiveling funnel 18, which is furnished with a swinging check valve "A." that remains open when the funnel mouth is directed forward. In this position, the greater air pressure is from without in consequence of the head resistance encountered by the general advance of the machine, so that the valve remains open. But a reversal of the pressure, as when the buffers encounter the earth or water, closes the entrance passage by the swinging of check valve "A.", which enables the buffers to retain their cushioning or buoyant effect when desired.

The details of the above arrangement consist of the funnel 18 having the upper part or hood composed of some pliable fabric.

18ᵇ is a rim of rigid material, 18ᵃ a hinge joint in the rim, the pivot of which is the uppermost end portion of a rib 18ᶜ sewn into the funnel fabric 18. A set of four such ribs supports the rim and fabric.

When the funnel mouth is turned to leeward, the air pressure causes it to collapse by falling inward at the joints 18ˣ, when it assumes the form depicted in Figs. 30 and 32. The wind, in rushing past these narrow orifices, induces the air contained in them to follow by cohesive attraction (commonly termed aspiration), by which means the contents of the buffers is gradually exhausted. The arrow between the Figs. 31 and 32 indicates the direction of the wind common to the operation of the funnel in both said figures.

In Figs. 31 and 32, the tube 10, into which the funnel is inserted, is shown in vertical section. A check valve "A," in Fig. 31 is free to close from inside pressure, as when the buffers are compressed from any exterior cause; but when the funnel is turned rearward, as may be done by the winding or unwinding of the pull cords 19 on the funnel stem—manually operated—a short lug B. upon the hinge part of the check A., engages an inwardly projecting portion of the tube 10 which effectively holds the check open, leaving the internal air free to escape and reduce aerial friction by reducing external air displacement. The tube 10 may be connected freely with the buffers 17 by any common tubular connections that are airtight.

All power of locomotion and buoyancy is furnished by the motor 21, which is here shown with its plane of rotation horizontal. It is rigidly suspended from the spar member 1ᵃ by braced hangers 20. The vertical crank shaft 22 is furnished with a clutch 23, operated by a lever, 23ᵃ, convenient to the attendant's reach. Said shaft 22 penetrates the frame member 1ᵃ and the bearing 3ᵃ, the latter having the shaft opening underneath slightly slotted to allow for transverse oscillation. A universal joint on said crank shaft, situated exactly in the axial center of member 1ᵃ, enables the upper section of said crank shaft to be securely journaled to the metal part, generally designated 3ᵃ, with which and the standing frame of the machine, it remains in permanent position, while the motor has a side swaying capacity integral with the spar 1ᵃ. Over the main bearing 3ᵃ, and keyed upon said crank shaft, is a small bevel pinion 24 through which the driving power is transmitted to the acting members of the machine. Two lengths of tubular shafting, 25, 25ᵃ, extend fore and aft, from said driving pinion 24; each section having a bevel gear wheel integrally fixed to each of its extremities; the one adapted to mesh into said driving pinion 24 being relatively much larger than the one on the opposite end. Suitable bearings are provided adjacent to the hubs of said gear wheels for the support of the said shaft sections, 25, 25ᵃ, the inward bearings being in the standing portions of 3ᵃ, designated in detail, 26; the outward bearings being situated respectively upon and integrally with the band bearings 3 and 3ᵇ, and said shafts extend forwardly and rearwardly from their central bearings 26 and pass through the vertical posts, generally designated with the band bearings upon which they are erected, 4 and 4ᵃ, wherein they find additional bearing.

The wings, 35, 35ᵃ, which constitute the means by which ascension and propulsion are attained, are driven in circular orbits by the rotation of shafts 27, 27ᵃ and 27ᵇ, 27 upon and to which the arms that carry the said wings are rigidly attached. The plane of rotation of said propelling wings is coincident with the line in which the vehicle travels, and consequently all the axial members directly involved are transversely placed in respect to the machine. The said shafts, 27, 27ᵃ, situated on the forward part of the machine, form the sections of one line and are connected by a universal joint at the junction with the central spar 1ᵃ at the band bearing 3. In like manner, the remaining rearward sections 27ᵃ, 27ᵇ, meet over the central spar 1ᵃ at band bearing 3ᵇ. The outward ends of the sections 27 and 27ᵇ are journaled in bearings secured to the frame member 1, their inward bearings being situated next to the universal joints on the band bearings 3 and 3ᵇ. Sections 27ᵃ, 27ᶜ, are likewise supported in bearings on the spars 1ᵃ and 1ᵇ.

The arrangement shown as having the shaft line, 27, 27ᵇ, or 27ᵃ, 27ᶜ, in two sections, is in consequence of a slight inclination (5 to 10 degrees) which each said section normally bears to the horizontal while it is still desired to have both sections positively rotate in unison. The junction of the two shaft sections of each line is more elevated than the outer ends of the same said shafts. A bevel gear wheel is fixed upon one section of each said line of transverse shafting, in this instance on 27ᵃ, 27ᶜ, and adapted to mesh with the smaller wheel on each of the longitudinal shafts 25, 25ᵃ. By this means all four transverse sections rotate at a uniform rate of speed in positive communication with the motor 21.

The term "gliding" as used in this description signifies such structural qualities of parts as peculiarly adapt them to pass rapidly through the air with little detaining resistance. These qualities are directly attributable to, first, form, that cleaves and afterward restores the air mass with the least disturbance. Second, surface, that defeats any tendency of the atmosphere to cling to and be dragged with the moving part: and third, position, that eliminates the retarding effect of gravity. That is to say, if the supporting surfaces are inclined forwardly, upward, gravity tends to pull them downward and backward and prevent them gliding; whereas if they are inclined forwardly downward, the same force tends to accelerate their progress forward.

All the propelling wings are adapted to lift and to glide, and in the machine as herewith illustrated, are distributed in pairs which, with their supporting and controlling mechanism, form four complete units. Each unit has for its main axial member one of the beforementioned transverse shaft sections (say 27ª). Upon the said shaft are clamped, or otherwise rigidly secured, two pairs of wing supporting arms. Each arm of a pair is in direct radial opposition to its mate, is at right angles to its supporting shaft, 27ª, and in cross section is laterally flattened. The pair of arms 30 and a similar pair, 31, are situated adjacent to the bearings of said shaft and are parallel with each other. The said arms that support the wings have holes pierced through them near their extremities to act as bearings for the reception of transversely extending rods or tubes, hereinafter termed wingbone tubes, 32, 32ª. These said wingbone tubes extend from the arms 30 to the arms 31 and rotatably occupy the said bearings in the arms like any ordinary shafts in their bearings. The said member 32 or 32ª, after passing through the said arm bearings, project sufficiently to enable an arcuate stop lever 33 or 33ª, to be rigidly secured thereon, one on each end of the said wingbone tube; but the stop on one end occupies a quadrant of a circle that does not symmetrically correspond with the position of the stop on the other end, in this instance having a radial difference of ninety degrees, as will afterward be more fully explained.

The members 32 and 32ª are parallel with each other and with the shaft section 27ª, and are the basic supports in the construction of the propeller wings 35, 35ª. Said wings have no right rotary motion of their own but because that portion of their area posterior to their axial supports, 32, 32ª, greatly exceeds the portion anterior to their said axial supports, the preponderating rear portion of the wing will govern its position as a whole, as the corresponding portion of a weather vane controls that instrument when currents of air press upon it.

At this stage of the description if the assembled mechanism comprising only the shaft section 27ª, the arms 30, 31, and the wings 35, 35ª, be revolved in calm air, it will be understood that the plane of the wings will assume and maintain a position approximately tangent to their orbit of rotation. If, however, the mechanism be caused to revolve with its plane of rotation parallel with the direction of a strong wind, similar to the self created draft encountered by a traveling aeroplane, the wings will no longer assume a position tangent to the circle of their orbit, but one of varying attitude toward the mechanism, being in fact, the resultant of the directive force of the wind and of the circular draft created by their own movement. Thus if the speed of the wind exceeds the rate of the wings' movement, the said wings will always maintain the same edge to the wind. The position of the said wings is however as truly neutral in conforming to these dual forces as it was with the single one of rotary movement alone. This is an essential feature of the invention.

To render the wings 35, 35ª, effective for lifting and propelling the machine, additional arms, 38 and 38ª, are provided to control the position of the said wings while moving on the downward half of their orbit. The said controlling arms are of the same length as the wing-supporting arms and revolve synchronously therewith; they are situated between the bearings, as 28 and 29ª respectively, on the spars 1ª and 1ᵇ, and the wing supporting arms, 30 and 31, and revolve upon disks 36, 36ª. The object of expanding the pivotal support of the said controlling arms to proportions of a disk (see 36, 36ª, Figs. 23, 25) is to have the axis of the supporting arms and of the contiguous controlling arms offset from each other in their common plane of rotation, and still enable the said supporting and controlling arms to revolve continuously, as a parallelogram over and about the shaft section 27ª. Each disk, as 36 or 36ª, has two supports, the shaft 27ª which penetrates it loosely just inside of the periphery, and the rigidly attached lever, 41ᵇ or 41ᶜ, which prevents accidental change of position upon the shaft 27ª.

The connections that couple the wing-supporting arms, 31, 30, and the controlling arms, 38, 38ª, and substantially form two sides of a jointed parallelogram, are the beforementioned arcuate stop levers 33ª, 33. From the previous description it will be clear that these levers 33ª, 33 and the wing 35 tilt integrally with the wingbone tube 32. The arcuate slots, 40 and 40ª, in the said levers 33ª, 33, are adapted to slidably engage with laterally projecting, flange-headed pins, 39, 39ª, integrally affixed in the arms 38, 38ª, near their extremities, so that however much the wing or stop may tilt, a standard length of coupling material may be maintained between the extremities of the said supporting arms and of the controlling arms.

Inasmuch as the relative positions of the wingbone tubes 32, 32ª, and the flange-headed pins, 39, 39ª, in respect to the position of the axial member 27ª and the axis of the controlling arms (the center of disk 36 or 36ª) are always parallel, it follows that by shifting the eccentricity of the disk 36 or 36ª in its position relative to the machine, but still in its normal plane, the pins 39, 39ª, will vary their positions accordingly and provide new stopping positions for the ends of the slot 40 with each changed position of the said disk 36 or 36ª, and will limit and control the extreme degree of inclination that the said wing may assume on the effective or downward stroke, or to which the said wing may idly tilt on the upward or return stroke.

In detail, a stop-lever 33 or 33ª, consists substantially of a sector of thin metal plate rigidly secured at its radial center to an extremity of a wing-bone tube, 32 or 32ª, and by this means forms an integral part of the wing. At a radius equal to the distance between the axial centers of rotation of the wing-supporting arms and of the controlling arms, an arcuate slot 40 is cut, its arc having the wing-bone tube for its center. The said flange-headed pins 39 or 39ª project from the said controlling arms 38 or 38ª and pass through the said slot 40 and is prevented from leaving it by the flanged head. The pin 39 or 39ª is fitted to the slot 40 so as to slide or rotate easily therein. One end of the slot 40 is arranged to come in contact with the pin 39 or 39ª when the wing is moving downward. In this position, which may be called normal, the fore and aft plane of the wing 35 remains approximately parallel with the spars 1, 1ª, 1ᵇ, of the machine. The end of the slot 40 opposite to that above mentioned may only occasionally come in contact with the said pin 39 or 39ª, as when the wing tilting is extreme, which is likely to occur when the machine is starting in calm air or in the same direction as the wind may be moving. The length of the arcuate slot 40 is unimportant but is not too short to allow the rising wing to assume a position tangent to its circular path of translation. The position of the said slot 40 in respect to the wing plane has no material significance if the said stop levers 33 and 33ª, at opposite ends of the said wing are set at an angular difference of 90 degrees from each other, as illustrated in Figs. 23 and 25. The object of the above arrangement is similar in function to that of cranks and coupling rods on a railway locomotive where the angular difference of the cranks on one side of the machine to that of those on the other prevents any possibility of the piston rods of the engines on both sides of the locomotive being in line with the crank pins and centers of the wheels at the same time.

The above example, which is familiar to many, will render it clear how the limits of the angle of the propeller wing 35 are always under positive control of the mechanism, either at one end or the other, and intermittently controlled from both ends simultaneously during the descending movement of the wing.

As previously described, the propeller wings are supported on trunnions, the axial line of which, in each wing, may be regarded as dividing it into two unequal parts—anterior and posterior, the latter greatly exceeding the former in area; this predominance of posterior surface possessing the vane-like quality necessary to turn the wing on its pivots to present always the same edge to the air current. It will be obvious, however, that any extension of a vane, or its equivalent, the wing, forward of its pivots, will tend to neutralize the turning effect of the wind upon it until when the area is the same on both sides of the pivot, the wind pressure will have been balanced and ceased to have power to move the wing.

As it is important that the wing should tilt on its trunnions quickly and assume a position as nearly neutral to resisting pressure from any direction, when the upward or idle stroke is begun, openings are provided to allow the air to readily pass through the anterior part of the wing, that the posterior part may receive nearly the entire benefit of the directive force of the wind. It is constructed as follows:—The top of the wing is completely covered with the chosen fabric, but on the anterior portion, midway between the ribs 108, the said fabric is slit in a fore and aft direction. This proceeding will not materially change the completeness of the surface covering until air pressure upon the margins of the slits 43 causes the fabric to sag and spread open (see curved dotted lines Figs. 6 and 7) forming the passages desired. The under covering of the wing is in two sections, a fixed portion covering the entire area posterior of the axial member 32 or 32ª, and an anterior portion consisting of a semi-rigid flap, 43ª, that is flexibly attached to the underside of the forward margin of the wing. The said flap 43ª is essentially a check valve and overlaps a short portion of the forward part of the rear under-covering of the wing, so as to effect a complete closure when the pressure of the air is upward, as when the wing is descending, which is termed the effective stroke.

The above valvular action of the wing is useful when the machine is starting in calm air or hovering over one locality when in mid-air, but in other phases of flight it has little or no function. It is not, however, desired to confine the wing valves to the exact construction as above described, but may comprise any valvular means by which a propeller wing of the class described may be relieved of air pressure on that portion anterior to its axial supports for the purpose of facilitating the vane-like tilting of the said wing.

A small difference in the longitudinally angular position of the plane of the propeller wings to the horizon materially affects the results of their action. If the disks 36, 36$^a$, are so set as to give the wings a forward and upward inclination, the result will be to climb or ascend. If given a slight inclination forward and downward, the tendency will be to coast or to glide forwardly downward; but if the dynamic force of the wing-stroke equals the coasting tendency, no loss of altitude will occur, but a portion of the lifting impulse will have been converted into horizontal velocity. If the wing be set at a still greater forward and downward angle, the coasting impulse will be strengthened beyond what the lifting phase of the wing-stroke may be able to entirely balance, with the result that the general velocity of the machine will have increased but its altitude will be gradually diminished. When for any reason the power is shut off in mid-air and a gliding descent is begun, the angularity of the wing plane should then also be adjusted to suit. At the ending of a glide a landing may be effected with accuracy by giving the wings an abrupt inclination to the line of movement and the progress of the machine abruptly retarded. In order to accomplish these results it is necessary that the full complement of propeller wings be constantly subject to instant and accurate adjustment. The following describes how this is accomplished. A centrally situated hand lever 37 has communication with all the disks and moves them simultaneously or unitedly holds them fast. As depicted, the complement of disks is eight, four on each side of the machine; but as each pair of wings and their actuating and controlling mechanism forms a complete unit—the remaining pairs of wings and their mechanism being repetitions of any given unit—it will be sufficient to describe the connections of the one unit chosen. (See Fig. 33).

Disks 36 and 36$^a$ are situated on the same transverse shaft section 27$^a$, each disk having the eccentricity of its mounting 90 degrees different from the other. The levers 41$^b$, 41$^c$, however, that are attached to and form an integral fixture with the said disks, depend in such a manner that their extremities are at an equal radius from the shaft section 27$^a$ which forms their pivot. The alinement of the said lever's extremities with each other is also parallel with the said shaft 27$^a$, whatever may be the normal or adjusted position of the said disks. A rod composed of two sections, 42$^a$, 42, couples the two levers, 41$^b$, 41$^c$, and incidentally their respective disks 36 and 36$^a$. These disks are respectively situated on the inward ends of the front and rear said shaft sections 27$^a$, 27$^c$, to the right of the spar 1$^a$ looking forward. The outwardly situated disks 36$^a$ and the mate to 36$^b$ (not shown) are also coupled by the two rod sections 42$^b$, 42$^c$, through the levers 41$^e$, 41$^c$. The above, designated outside and inside coupling rods are connected for simultaneous movement by a transverse rocker shaft section 44$^a$ and its integral arms, 46$^a$, 46$^b$, that are pivotally connected respectively to the parallel coupling rods 42$^a$, 42, and 42$^b$, 42$^c$. The said rocker shaft 44$^b$ is journaled to the frame members 1$^a$ and 1$^b$, the inwardly situated bearings being integral with the gear bridge 26 and designated 45$^a$; the other one being in the body of the frame member 1$^b$, is not indicated by a reference character. It will be evident then that the shaft 44$^a$ and the arms 46$^e$ and 46$^b$, all being rigidly integral, and the shaft 44$^a$ being fixed to the frame of the machine without freedom of movement except of rotation, will positively govern the position of the four disks designated. That portion of the mechanism for wing control on the opposite half of the machine being a duplicate of the half described is connected as one thereto by a universal coupling or joint on the said rocker shaft 44$^a$ and situated directly over the central spar 1$^a$. As the levers depending from the inwardly situated disks and the arms from the opposite sections of the rocker-shaft may be made to converge beneath the spar 1$^a$ one coupling rod 42$^a$, 42, in this position is sufficient for the said four inwardly situated disks. The hand lever 37 operates on the fixed pivot 60 and has its weight arm pivotally connected to the said rod system 42$^a$, 42$^b$; it thus operates to simultaneously control all the disks and consequently the angle of incidence in the full complement of propeller wings, and by means hereinafter to be described more in detail, fix them to maintain any desired inclination of adjustment.

The propulsive method above described should not be confused with mechanical equivalents of a marine ship's paddles, there being no directly backward action nor additional obstruction to the current, whatever the relative velocity of the machine, as a whole may be to the revolving rate of the said propellers, or whether they be relatively motionless and positioned stationary at any point of their orbit, or reversed: horizontal impulse in this case is purely the resultant of the slightly inclined lifting thrust of the wings and the vertical pull of gravity. A slight forward and downward inclination of the wings results in their describing cycloidal curves that are greatly elongated in a forward horizontal direction because of the constant tendency to coast, or glide, even while the machine, as a whole, may be ascending.

The car, which is pendent, is made rigidly integral with the central spar 1ª. The frame of the said car consists primarily of a rectangular wooden loop, 47, 48, 49, the forward lower corner being rounded; 48 may be designated the stem, 49 the stern post, and 47 the keel or tie-piece. The car sides 50 which are externally convex, are hinged by their uppermost edges to the spar 1ª and at their lower edges adapted to fit closely to the keel-piece 47 whereto they may be temporarily secured by any of the ordinary means of fastening, as a sliding bolt and engageable socket or a spring catch. The sides 50 are constructed of rectangularly crossed lattice, the vertical ribs of which being the more rigid members, those on the outside having rounded edges and positioned horizontal; the top and bottom edges of said car sides being practically straight and fitted closely to the spar 1ª and keel 47. A suitable fabric is tensely stretched over said lattice and secured to the four edges of said car side 50. Funnel shaped ventilators may be inserted in said car sides 50 as shown at 51 for engine cooling purposes and a further rearward heat escape 52 situated next to the supporting spar 1ª. The forward part of the car is a wind shield 50ᵇ of parabolic contour in horizontal section and is built integral with the frame 48, 47, having its rearward edges well out toward the full width of said car sides 50 so as to preserve the flowing lines of said car body without angle or break. The covering of said wind shield is necessarily of transparent material. Adjoining the rear edges of said car sides and likewise made to neatly correspond in outline, is the rudder section 54, which is much more thinly and straightly tapered than the forward part of said car, and terminates with the sides overlapping the rudder 54ª at 50ª the full extent of its height. As the lower part of said member 54ª is the part desired to act as a rudder, this portion is rearwardly extended nearly to the limit of its available space, while the upper part is shortened, giving a side contour very similar to that of a ship's rudder. Unlike a ship's rudder, it is not hinged to the main craft body but is rigidly integral therewith, depending for its deflecting function upon the increasing lateral flexibility of that portion rearward of its junction with the said car body; its construction is as follows:—Into the rear-side of the stern-post 49 are inserted the butt ends of a number of tapering, flexible, blade-like members, generally indicated by the numeral 55, which point horizontally backward, the full series being in vertical plane; a short distance forward of said stern-post 49 is a tubular upright shaft 56 rotatable in socket bearings, secured to the spar 1ª and to keel piece 47; on to this shaft are fixed, through their common focal center, a series of disks or disk sectors 57, each sector being in lineal correspondence with one of the aforesaid rudder blades. As these blades vary in length, the corresponding disks also vary in diameter so that a ligament fastened to the extreme forward part of a said disk sector's circumference and thence, from opposite sides, tensely drawn backward and connected with its corresponding rudder blade's outward tip, will cause said blade to bend toward the side to which said ligament is shortened by its winding upon said disk sector as caused by the partial rotation of main sector 56. The wide and the narrow parts of said rudder are thus bent to an approximately uniform curve. But in order to induce concavity to said rudder exterior, when flexed, it is necessary to connect said ligaments at short intervals with cross ties 55ª, 55ª, secured as well to the intermediate rudder blades as shown.

The rudder is covered with material similar to that of the car body, preferably being finished at the rear by having the two converging fabric edges cemented together by a celluloid adhesive in order to obtain a tough, pliable and non-frayable final to rudder and car and also to enable the rear boundary to be as thin as possible, the better to aid in a commotionless confluence of the two currents of air, separated in the first instance, by the passage of the car.

Inside of the car as described, but separate from it, is a receptacle termed the cradle 63 for the immediate support of the operator and load; it is held in suspension by two oscillatable levers, 58, 59; the pivots upon which they oscillate being placed near the apex of V-shaped hangers attached to the central spar or stringer 1ª at points that allow of space in the front and rear of said car sufficient for the oscillations of said cradle. The forward suspensory lever 59 extends above its pivot of suspension, the pivot 60, to the extent of 59ª penetrating the spar or stringer 1ª, through which a V-shaped slot is made adapted to its fore and aft-wise oscillation; the lower end of said lever is pivotally connected with the front of the said cradle 63. The rearward suspensory lever 58 differs from the front 59 by having two limbs and in having a shorter extension above its pivot 60ª. The upper ends of the said two limbs are integrally connected; the space between them, above the pivot 60ª, is shown in the drawing as being occupied by the fuel tank 62 sustained by independent straps to the spar or stringer 1ª above it. The lower ends of said lever 58 are pivotally connected to the extreme rear of the cradle 63.

The cradle 63 must not touch the car sides and is prevented from so doing by guide clasps 64 affixed to the central underneath part of the cradle, loosely engaging the upper portion of the keel, or keelson 47 of the car in a manner that confines the independent movement of the cradle to a direction forward and backward. The body of said cradle 63 is composed of one, or two, longitudinal core pieces 65 with a regular series of wooden ribs 66 transversely issuing therefrom on the sides and radially arranged in front. The outward ends of the said ribs curve upward to form a concave skeleton receptacle bounded by a wooden tie piece or gunwale 67. A strong cord 68 attached to the central spar or stringer 1ª and to each gunwale near the middle of the car, assists to steady and support the said cradle.

Two slight pillars or stanchions, each attached to the gunwale on its respective side, stand at the rear of the cradle; a pair of cross rails tie the upper portion of the said stanchions together and are braced with wire. The numeral 68ª is generally applied to the said pillars and their cross ties. The use of the said stanchions 68ª is to support the rear ends of side rails 69 that extend along both sides of the cradle to its front, where it abruptly curves downwardly and returns to the gunwale, it being desirable to keep the front view unobstructed. The space between the rails 69 and the gunwale 67 is filled in with a tightly drawn netting 70 for the security of the occupant and as a guard to prevent contact with the car sides.

The front suspensory lever 59 is not directly attached to the cradle frame but with a T-shaped member 71 laterally flattened in its upper, horizontal limb and pierced with an arcuate slot 72; the vertical portion or stem being integrally and rigidly attached to the forward extreme of the said cradle. The lower end of the front lever 59 is laterally compressed and bifurcated at 73, being adapted to loosely clasp and follow the flattened portion of the said T-shaped member 71 in a slidable manner.

Through the flattened terminals comprising the lower part of lever 59 a hole is pierced transversely for the reception of a bolt 74 which also passes through the slot 72 and thus forms a pivotal point of suspension that can be varied in position forward and backward and by this means change the center of gravity of the load and the normal attitude of the levers 59, 58, toward the front and rear guide vanes with which they are connected as hereinafter described.

In detail the adjustable connection between lever 59 and the T-shaped member 71, as illustrated in Fig. 14, comprises a square-shouldered bolt 74 extending through the lever 59, the squared shoulder accurately fitting a hole of corresponding shape in the bifurcated portion next to the head of the said bolt, a pinion wheel 77 adapted to mesh into, and roll on, a rack on the upper side of the slot 72. A hand wheel 75 with a hub extension on one side has a portion of this part shaped into a square tenon that accurately fits into a similar shaped mortise in the center of the said pinion wheel 77. The said pinion wheel 77 is of even thickness with the metal surrounding the slot 72 into which it is placed, the tenon of the hand wheel is then inserted into its mortise through a circular opening, or bearing, in the lever 59, on the side opposite to that engaging the bolt head and adapted to receive the circular part of the hand wheel hub extension. The shank of the said bolt 74 passes through the hub of the hand wheel and has a threaded portion projecting; a combined clamping nut and finger lever 76 is made to fit the said projecting bolt-end, by which means the hand wheel 75, the pinion 77 and the bolt head 74 may be clamped rigidly against one limb of the said bifurcated portion of the lever 59 and prevent this pivot from changing its point of engagement with the said cradle. The sides of the said bifurcation do not, however, press upon the flattened member 71 but leaves the pivoted connection with freedom of oscillation only. When released of the pressure of the finger lever, said pinion 77 is free to roll on the rack in the slot 72 and the hand wheel 75 rotates in unison therewith upon its axis—the shank of the bolt 74.

An inflated air mattress 80 is shown in the hollow of the cradle 63 adapted for a light and comfortable cushion for the operator, also the same is shown doubled over at the front as a seat; it could be used also as a life preserver in case of accident while crossing an expanse of water.

The bent hand lever 37 has the same pivot 60 as that supporting the front suspensory lever 59. One of its limbs, the weight arm 37ᵇ, is normally vertical and the other horizontal; the latter is intended for manipulation by the operator and its function, the adjustment of the angle of incidence of the propeller wings as has been hereinbefore set forth. The handle portion 37ª of the said lever 37 is purposely placed in a position as nearly as possible vertical to the operator's position, to prevent unbalancing stresses due to the upward and downward effort necessary to effect the adjustment of the said propeller wings, for, should the manipulating pressure incline toward the front or rear, the cradle 63 would instantly yield and deflect the guide vanes with which it is connected, temporarily affecting longitudinal equilibrium. It is immaterial whether the said lever 37, 37ᵃ has both limbs continuous, or as is shown in the drawings, with the arms separated and situated on, but rigidly integral with, the pivot 60. In the latter case the arms are bent so that their ends may nearly coincide with the central line of the machine. To the said hand lever 37 is attached a compressible spring stop lever 37ᶜ, shown on enlarged scale in Figs. 13 and 28, to engage a series of stop notches 83 in a fixed quadrant 84 contiguous to the said lever 37 and secured to the front hanger's after-brace 82ᵈ for the purpose of preventing accidental change in any adjustment that it is desired to maintain.

The guide vanes 78ᵃ, 79ᵃ and 78, 79, are four in number, of elongated, rectangular shape in general outlines and rendered sufficiently rigid by wire trussing to resist normal bending or twisting strains and to truly convey throughout their length a tilting movement applied to one end of each said vanes.

The axial supporting member 85 which penetrates the vane through its entire length in excess and protrudes in the form of trunnions similar to those on propeller wings, as 85ᵃ, more nearly intersects the surface area into equal anterior and posterior portions than is the case with the propeller wings 35, 35ᵃ, but the posterior portion necessarily still slightly exceeds the anterior in extent. Socket bearings 86, 86ᵃ, are provided for the trunnions of said vanes on the three spars 1, 1ᵇ, 1ᵇ, that are essentially stringers to the frame of the machine, to rotatively retain and support said vanes 78, 78ᵃ,—79, 79ᵃ, which traverses the extreme front and rear of the machine.

Upon each end of central stringer 1ᵃ, is placed a unit of deflecting mechanism comprising a laterally flattened, semi-circular, metal arch, divided by a longitudinal slot so as to practically form a pair of parallel arches 89. The base of the above mentioned double arch is a socket 87, 88, adapted to accurately fit, and be firmly secured to one of the extremes of the stringer 1ᵃ by rivets or other ordinary means. The above mentioned socket 87, 88, is also transversely divided into two sections, one to each end of the said arch 89, or if preferred, it may be allowed to remain as one continuous socket but having the central portion reduced in diameter for the accommodation of a plain, encircling, metal band, or one provided with grooves for ball bearings, its function being to carry integrally two transversely opposed sockets for the reception of the inward trunnions, or axial supports of guide vanes 78, 78ᵃ, which approach each other from opposite sides of the machine. The edges of each arch 89 are shown beaded in the drawing, for strength and also to act as holding guides for the adaptation of curved flanges 91ᵃ, 91ᵇ, on a sector plate 90 adapted to slidably occupy the longitudinal slot dividing said arch 89. It is necessary that this sector plate 90 should accurately fit its assigned position for the sake of the lateral rigidity required of it, but at the same time move easily in an arcuate path longitudinally; its dimensions should also be as large as is compatible with the space needed for its movement as indicated on the drawing Fig. 21 in dotted lines. The flanges 91ᵃ, that are downwardly projecting parts of the said sector plate, are necessarily short on account of the restricted space in which they have to move.

The functional purpose of the movable sector-plate 90, slidably operative in the arch 89, is to support and maneuver a metal beam 92 laterally and symmetrically extended on both sides of a projection 91 of sector-plate 90 to which it is fixedly secured. To obviate unnecessary weight and obstruction to the current of air incidental to the advancing machine, the said beam is made in skeleton formation as shown in Figs. 19, 20 of the drawings. To the laterally extended arm extremes 93, 93ᵃ of the said skeleton beam 92 are attached short, flattened connecting rods 94, 94ᵃ, which are also attached to the guide vanes 78, 78ᵃ, at a point forward of the axial line of said vanes. Universally pivotal points are provided at all four points of connection between said skeleton beam 92 and guide vanes 78 and 78ᵃ.

The rear deflecting mechanism is similar in essentials to that described but is relatively inverted and the tilting beam 92ˣ, instead of being straight is crescent-shaped to allow for space occupied by the stringer 1ᵃ.

A metal band sufficiently loose for rotation surrounds that portion of the stringer 1ᵃ situated between the basic arch sockets 87, 88, and supports the trunnion sockets 86 at the intersection of the guide vanes 79, 79ᵃ, with the said stringer 1ᵃ.

The described mechanism is operative as follows:—For example, the machine, while moving, is sloped abnormally downward, which causes the cradle 63 to swing forward by force of gravity: slidable rods, 61, 61ᵃ, attached to both suspensory levers' upper extremes 96 and 96ᵃ respectively, communicate a pull to the forward guide vanes 78, 78ᵃ, causing them to rise in front, which induces the forward part of the machine to slide upward on an inclined plane of air formed by the said vanes' line of cleavage in that direction; also, simultaneously, the rearward suspensory lever 96 communicates a push to the slidable rod 61ª attached thereto and thence to the skeleton beam 92ˣ attached to the rear vanes 79, 79ª, with the result that the forward portions of these vanes are depressed; the tilting movement of the said rear vanes, however, is of less degree in this instance than that of the forward vanes as actuated by the same cradle movement, the different ratio being due to the different radial lengths of back and front suspensory levers above their pivots 60. It is held, however, that the spirit of this invention permits of changing the relative difference in the extent of tilting movement between the front and the rear vanes that is effected simultaneously in the manner described.

A steering wheel 97 within the car faces the operator's position. A screw-tightened clamp 98 carrying a horizontally projecting pin is firmly attached to the shank of the front suspensory lever 59; the said steering wheel has a hub-extension 99 on the front side thereof, having a concave periphery adapted to act as a winding drum or windlass. In the axial line of the wheel 97 a hole penetrates the hub 99 for the rotative support thereof upon the pin 98, and a threaded nut and washer engages the protruding said pin-end to retain the wheel in position. A double series of pulleys 100 with channeled peripheries are permanently placed in pairs, closely parallel, in the upper part of the said car for the support of a strong cord 103, led in parallel circuit from a fastening on the rearward side of disk 104 (upon the disk sector shaft 56) forward by one side of said pulley series, then with one full turn around the windlass 99 back to the starting point by the remaining series of pulleys on the opposite side of the car center. Directly above the steering wheel 97 are two pairs of pulleys, of said double series, one pair being mounted on the supporting pivot 60 of the front lever 59, one on each side thereof; another pair close by on axial pins integral with the forward hanger's after-brace at 101 provides for an additional cord line 102 spliced into the main circuit led over the first mentioned pulleys 100. By this arrangement a central draft is obtained on the steering cord which does not interfere with absolute oscillatory freedom. It will be recognized that as the steering windlass is the only point of connection between car and cradle that is subject to strains that are not self-adjusting, and would in consequence, if not conducted through a neutral path, as through the exact pivotal center, tend to draw the supporting lever 59 toward the divergent direction in which the cord is drawn.

As the distance of the periphery of the grooved pulleys from the pivot of load suspension is appreciable, the strains of lateral steering would tend to interfere with vertical steering and automatic longitudinal stability, but by providing a pair of additional pulleys, leaving only sufficient room between the two pulleys 100 and 101 on each side of the circuit for the passage of the steering cord, and by dividing the cord, or using two cords, unintentional movements and unbalancing strains are reduced to a minimum. This method is preferred on account of its compactness, over that of using a single set of pulleys at this point, that would necessarily be widely apart on pivots separate from the load-supporting pivot and offset sufficiently to allow the peripheries of the pulleys to intersect the axial line of the main pivot 60.

The operation of steering consists of turning the steering wheel 97 to the right or left, for lateral direction. As the cord circuit is shortened on one side, by the windlass 99, its contraction is diffused to all the ligaments on that side of the rudder blades 55, and the rudder is thus curvedly deflected to the side receiving the forward pull from the said steering cord. The reaction of the passing air current upon said deflected rudder causes the entire car and the stringer 1ª to oscillate to the side opposite said rudder deflection, and in so doing the front and rear guide vanes 78, 78ª,—79, 79ª, are deflected by means of the skeleton beam 92 before described and which is laterally inflexibly subject to the same oscillations as the said car and stringer 1ª. By this provision the machine anticipates the inclination necessary to counteract the centrifugal force of its momentum that would otherwise threaten its lateral stability on a sharp turn.

The method of automatically careening in advance of the actual lateral change of direction forms an essential part of this invention.

The manner in which lateral equilibrium is reëstablished when, from intentional or accidental causes, the machine is tilted, may be understood from the following:—As a simplified illustration, let it be assumed that the laterally rigid combination comprising the car and its load, the spar 1ª and the skeleton beams 92 and 92ˣ on the ends of the spar, is constantly in one position: that is to say, the car continually hangs plumb and the skeleton beams lie horizontal. The framing that supports the spar 1ª with its pendulous car and the wings, vanes and planes that support the framing (in flight) are, however, subject to unbalancing influences in the air that cause them to incline to one side or the other, and thus vary their position to the horizon and similarly, to the skeleton beams 92 and 92ˣ. The forward guide vanes 78 and 78ª, and those at the rear 79 and 79ᵇ, are substantially horizontal balanced rudders—one for each quarter of the machine. It has previously been explained that for longitudinal stability both front guide vanes simultaneously incline upward or downward and the rear guide vanes similarly, but in opposite inclinations. But in the matter of lateral stability the front guide vanes tilt upon their axis in opposite inclinations and similarly those at the rear. The guide vanes on the right of the machine 78ᵃ and 79ᵃ to one inclination, and those on the left 78 and 79ᵇ or vice versa to an equal but opposite inclination, its operation being clearly shown in Fig. 19 in which the skeleton beam-ends keep that portion of the guide vanes situated forward of their axis, in constant control through the connecting rods 94, 94ᵇ hingedly attached to the said beam-end and guide vane front. (The beam being tilted in the drawing, however, instead of the outstanding part of the machine, as would be the case when the deflection takes place from extraneous causes.) If the four guide vanes be regarded as rudders, it will readily be understood how the natural draft of the machine in flight actuates them strongly or weakly, upwardly or downwardly, according as a larger or smaller angle is presented and its direction as governed by the pendulum—the car. The controlling and the supporting portions of the machine are thus brought to approximately coincide and continue so.

To prevent the car swinging too far and thus exceeding the useful angle communicated to the guide vanes, pivoted stop pieces (designated tillers 106ᵃ and 106ᵇ) are attached to the car and to the inclined posts 10 and 10ᵇ.

The front and rear cleavage vanes mounted rotatively upon the inclined posts 10 and 10ᵇ are, as their name would imply, functionally inert, their use being to reduce aerial friction by covering an abrupt formation with one of stream-line contour.

In the drawing the foot pieces 105 and 105ᵇ are connected to the car stop pieces 106ᵃ and 106ᵇ and thus form tillers to turn the cleavage vanes to a position approximately tangent to the curve of travel in lateral steering—an immediate result of the pendulous swing of the car following the deflection of the vertical rudder. The arrangement of connected car and cleavage vanes is, however, non-essential and I make no claims therefor.

The propeller wings, the guide vanes and the main spreaders and rocker-shaft covering shields 107, have certain characteristics in common, viz: the exterior fabric tightly drawn over the upper and lower sides of wooden splints (having profiles similar to Figs. 8 and 9) which are imposed upon a strong core member extending throughout the full length of the said wing, vane, or plane, with sufficient additional length to act as supports. Said splints, or ribs 108, 108, are deeper than their supporting core, especially on the underneath side, that the covering fabric under stress may not yield to the extent of touching the said core and thereby form a ridge transverse to the passing air current, frictionally retarding progress and flight. The front edge 109, 109, of each said wing, vane and plane is made rigid by a wooden strip 113 parallel with the core. An edging of half-round rattan or the like, is fastened to the front extreme of a flanking piece 111 and thence to strip 113 at a point midway between said flanking piece 111 and adjacent rib 108 and there secured; from there direct to the point of said first rib and there secured, and thus repeated the full length of said wing front, and lastly secured to the opposite flanking piece, rendering the entire cleaving edge of said wing, vane or plane oblique to its normal line of progression. That portion of the rib 108 extending backward from the core member in a propeller wing 35 or a vane 78, is downwardly curved in profile, but as it is rendered flexible by removing much of its interior substance, by which it is divided into two elastic fingers, as shown in the drawing 114, Figs. 8 and 9, it yields to the upward pressure of air resistance in the active phase of its translated movement and assumes a formation that is with the exception of its front and rear margins, approximately flat (see Fig. 9). All the said wings, vanes and planes have their posterior margins as thin and gently tapered as possible and to this end have a border of sheet celluloid 57ᵇ cemented into this final part of the fabric. The tendency of the covering fabric to draw the said flanking pieces 111, 111, out of line is effectually resisted by inwardly convergent braces affixed respectively to the said flanking pieces near their extremes and diagonally opposed to the core member.

The vertical posts 4, 4ᵇ, the gear bridge 26 and the bevel gears and shafting situated in the upper side of stringer 1ᵇ, must necessarily be sheltered from the elements and also rendered as unobstructive as possible to passing air currents. For this purpose a housing 116 is provided to envelop all these said parts and furnish a frictionless outer surface. Said housing to comprise a series of slender arches 116ᵇ sprung transversely across said stringer 1ᵇ with their feet secured to the five band bearings 2, 2ᵇ, 3ᵇ, and 4, 4ᵇ of the stringer 1ᵇ; light fore and aft strips of wood 116ᶜ are laid over said arches, regularly spaced, with their extremities converging and firmly secured to said arches over which is fastened tautly a smooth fabric, preferably silken (see Fig. 4).

A vane-like shrouding 117 is placed upon transverse members 27, 27ª, 27ᵇ, 27ᶜ, to lengthen and reform the lines of their profile in the direction of the air current. It has no supporting power and must be loosely rotatable upon said shaft and free to assume the plane of least resistance. Its construction is similar to the guide vanes in other respects.

I make no claims for the motor herein indicated, nor the clutch and other appliances and accessories, as there are many efficient makes of these on the market; but What I do claim and desire to secure by Letters Patent is:—

1. In a flying machine having fixed, outer, longitudinal stringers and a central, longitudinal stringer supported therefrom with freedom to oscillate about its longitudinal axis.

2. In a flying machine having outer, longitudinal stringers tapered toward each end, and a central stringer also tapered toward each end and supported with freedom of oscillation about its longitudinal axis.

3. A flying-machine having a frame-work formed with a central longitudinal member, and outer longitudinal members lying parallel therewith and being lower than the central member, struts connecting the outer and central members and being formed with transverse minor struts diagonally trussed with wire.

4. In a flying machine, the combination with the outer stringers and struts supporting the same, and the central stringer, of a dorsal stiffening member connected to the outer stringers and having means thereon for supporting the central stringer with limited freedom of oscillation about its longitudinal axis.

5. A flying machine having a central and outer stringers extending fore-and-aft, and struts, to space the stringers apart, in combination with a dorsal stiffener comprising a longitudinal member surmounting the central stringer and having thereon a series of thin bands in the form of fitted bearings, within which the central stringer is free to rotate for a part revolution as described.

6. A flying machine having in parallel alinement a plurality of inflexible stringers outheld by transverse spreaders, in combination with a dependent, rigid portion of the frame beneath the central stringer and connected by tension ties with the extremes of the outer stringers.

7. A flying machine having a plurality of inflexible stringers in combination with a rigid, dependent portion of the frame beneath the central stringer and connected by tension ties with the extremes of the outer stringers, said ties being formed of flat steel tape having its plane in parallel alinement with the axis of the stringers.

8. In a flying machine having a plurality of longitudinal, inflexible frame members alike in all dimensions, having the central one of said members rotatively movable in a series of bands borne by a tube integrally and rigidly holding said bands in fore-and-aft alinement, the combination of a dependent, rigid portion beneath said central frame member, said dependent portion comprising two struts, slightly inclined from the vertical, fixedly connected at the lower ends, their nearest mutual approach, by a straight, fore-and-aft tie piece, each said strut at its upper end rigidly secured to a thin metal band, (of said series) encircling the aforementioned central frame member at a point approaching each extremity thereof, and tension tie strips of steel tape secured to the extremities of aforementioned side frame members and convergently secured to the lower angles of said dependent frame portion, the flat of said steel tape having its plane in parallel alinement with the axis of the aforementioned frame members as specified.

9. In a flying machine as described having a plurality of spar-like stringers for the basic members of its frame-work, the combination with the dorsal stiffener running parallel and above the central stringer of the group, of a plurality of vertical posts intermediate of the length of the central stringer and being pierced at their base by said central stringer, to which they are not affixed, and again pierced above by the said dorsal stiffener with which they are integral, and again above by power shafting, and the tie strips connecting said posts with the outer stringers and a fore-and-aft member connecting the lower ends of the posts.

10. A flying machine having a frame with a central and outer stringers, a dorsal stiffening member surmounting the central stringer, having posts upwardly protruding therefrom and ties extending fore and aft and laterally from said posts.

11. A flying machine having a framework with a central and outer fore-and-aft stringers, a dorsal stiffening member surmounting the central stringer having two short posts projecting upwardly from the top thereof, tension ties connecting the tops of said posts and extending fore and aft and connected to the extremities of the dorsal stiffening member.

12. In a flying machine having a framing including spar-like stringers as a rigid basework, the central stringer provided with a superimposed dorsal stiffener rigidly uniting a series of metal bands to form a cradle, within which said central stringer is free to rotate for a part revolution, the combination of a motor secured to the underside of said central stringer, a vertical driving shaft, a universal joint attached to said shaft with the pivots thereof exactly intersecting the longitudinal axis of said central stringer, a continued extension of said vertical drive shaft above said universal joint projecting through said central stringer, a vertical bearing for said drive shaft secured to the main horizontal bearing for said central stringer, a metal bridge also secured integrally to said central main bearing and spanning fore-and-aft wise a rectangular space for gearing, a second vertical bearing for the vertical drive shaft at its upper extreme in the middle of said bridge arch, and a bevel gear secured to said drive shaft in the lower part of said rectangular gear space, and propelling means driven by said gear.

13. A flying machine having a frame work with a central longitudinal stringer supported with freedom of oscillation about its longitudinal axis, a motor having a driving shaft with a universal joint in the axial line of the central stringer, and lifting and propelling means driven by the shaft of said motor.

14. A flying machine having a plurality of spar-like stringers for the main rigid parts of its frame, a central stringer transversely oscillatable in a series of band bearings rigidly integral with the fixed portion of the said frame, a motor whose plane of rotation is concurrent with the oscillations of the said central stringer to which it is secured, and flexible means for the transmission of power from the said motor, by way of the relatively fixed portion of the said frame, to the several groups of propellers relatively permanent in position to that of the motor.

15. In a flying machine and in combination a frame having outer stringers and a central stringer elevated above the rest, longitudinal shafting supported above the central stringer, and means for driving the same, transverse shafting connected to the longitudinal shafting having means therein permitting downward inclination of the same toward the outermost members and propelling means driven by the transverse shafting.

16. A flying machine having a central and outer stringers, a motor secured to said central stringer, longitudinal shafting connected to said motor, a plurality of transverse lines of shafting disposed at equal intervals, each of said transverse lines of shafting comprising two straight pieces connected by a universal joint located in the central and vertical plane of the machine, and gearing connecting the longitudinal shafting with the transverse shafting.

17. In a flying machine having transverse lines of propeller shafting, each said line composed of two equal, inclined tubes flexibly united by a universal joint, radial arms on the tubes supporting wingbone tubes extending between and rotatably adapted to bearings at the extremes of said arms, the combination of propeller wings firmly secured upon said wingbone tubes and extending approximately the full length thereof as set forth.

18. In a flying machine, a propeller wing rotatable about its longitudinal axis and having valvular openings anteriorly situated to said axis adapted to automatically assist the axial tilting of said wing.

19. The combination in a flying machine of a propeller shaft, radial arms attached thereto, wingbone members rotatably carried by the ends of said arms, propeller wings built over and integrally to said wingbone members having a series of valvular openings on the part anterior to said wingbones as set forth.

20. A flying machine having transverse lines of shafting extending on opposite sides of their central support, orbitally movable and transversely inclined wings actuated by the shafting, the inclination of the shafting and of the said wings on one side of the said machine being angularly positioned to those on the other, both said groups of shafting and wings lying in symmetrical opposition within an angular position of from 5 to 10 degrees from the horizontal, the outer ends being depressed for the purpose specified.

21. In a flying machine having a framing with central and outer stringers and transverse and longitudinal shafting secured to its framing within suitable bearings, a central motive power connected to the shafting, a rotatable connection between said shafting and the central motive power, the combination of downward thrust propeller mechanism comprising transverse shafting extending directly from opposite side frame stringers to an elevated angular junction over the central frame stringer, said angular junction being rotatively operative by means of a universal joint, pairs of straight and flattened arm members on each transverse shaft, having each a central perforated hub, and eye bearings at the extremities of the arm members, pairs of straight tubes journaled in the eye bearings and wing-ribs on said tubes.

22. A flying machine having propeller shafting placed in positions transverse to the general structure of the machine but not horizontal, propelling means integrally attached to symmetrically placed sections of said shafting, the rotating propelling members of which, on opposite sides of the machine, have their planes of rotation convergent below said machine.

23. A flying machine having propelling wings describing similar and balanced cylindrical figures on opposite sides of the central line, the axis of said figures being in a direction transverse to the machine's line of forward movement and being downwardly inclined from the center.

24. In a flying machine, a propelling mechanism including a shaft, arms thereon having a wingbone member pivoted to the extremities thereof with wings thereon permanently adapted for gliding support, a disk pivoted to the shaft, and a rotatable member thereon having stops adapted to limit the angle of incidence simultaneously in the complement of propeller wings and means for adjusting the position of the said member.

25. In a flying machine, a propelling mechanism comprising a transversely extending shaft, arms at each end of the shaft and radially and transversely extending therefrom, wingbone tubes journaled in the end portion of the arms, wings on the tubes, arcuate links connected to the extremities of the tubes, a disk pivoted eccentrically to the shaft and adapted to act as a pivotal support to a pair of controlling arms, stop-pins projecting from the end portions of said arms adapted to engage the arcuate links.

26. In a flying machine, the combination with the pivotally-mounted, combined lifting, propelling and permanently-supportive gliding wing, rotative means for translating said wing, including all parts thereof, at a uniform velocity during the effective phase of the said wing's movement, and means for permitting independent tilting of the wing in the plane of its general movement at any time.

27. A flying machine having adjustable deflector vanes at both the front and the rear lying in substantially the same horizontal plane and means operated by the forward or rearward tilting of the machine for deflecting said front and rear wings in differential position and degree to each other.

28. In a flying machine, the combination with a transversely pendulous car, of inclosing sides therefor hinged to the top of the car and adapted to completely inclose the car.

29. In a flying machine, as described, having a central longitudinal stringer supported with freedom of oscillation about its longitudinal axis, the combination of a pendulous car comprising a depending rectangular framing having the lower front corner rounded off, said framing integrally connected to said longitudinal stringer, said framing and its appurtenances free to oscillate transversely to the limit of its prescribed arc, and sides hingedly connected at their upper edges to said longitudinal stringer and adapted to inclose the car when lowered.

30. In a flying machine, the combination with the inclosed car of a stem, a keel and a vertical rudder adapted to afford a side wind the requisite bearing to catch and swing the car, and means operated by the swinging of the car to careen the machine toward the windward side.

31. In a flying machine, the combination with the car, a forward wind shield therefor having parabolic contour in horizontal section, said wind shield being permanently and immovably placed in relation to the car frame and integral therewith, convexed side coverings for the car, the upright, rearward and outward edges of said shield jointing neatly with said convex side coverings and arranged to continue the flowing contour lines of the car surface unbroken, the said car surfaces having their contours similarly and symmetrically opposed to said car body.

32. A flying machine including a suitable frame, a car and a cover for the car, having a laterally flexible rear portion and means for flexing said rear portion to attain lateral direction and stable inclination in the movement of the car and machine, said means including the steering rope, tensile connections bonding the flexible rudder blades with the rotatable sectors and shaft and the winding connection of the steering rope with one of the said sectors on the said sector shaft.

33. In a flying machine, the combination of a pendulous convex-sided car, a vertical rudder integral with the said car and means connecting the car with the horizontal guide vanes, said vanes adapted to careen the machine toward the side to which the rudder is flexed and by the deflective force of the air current upon the said vertical rudder.

34. In a flying machine, the combination of a universally pendulous cradle, a transversely pendulous car to envelop the said cradle, guide vanes at the front and rear of the machine, a vertical rudder attached to the rear of said car and means operable through the combined gravity movements of the said cradle and car to actuate the said guide vanes for equilibrium in traveling direct and the same combination with the additional element of the said vertical rudder to accomplish equilibrium in traveling a curved course.

35. In a flying machine, the combination with a car, of pivoting cradle links extending from the supporting spar to the front and rear of the cradle and means for adjusting one of the links to various pivoting points on the cradle.

36. In a flying machine, the combination with a car and a cradle, of pivotally movable links connecting the supporting spar with the front and rear of the supported cradle, a pivotal connection between one of the said links and a longitudinally-slotted plate, said plate being rigidly integral with the cradle, means for changing the said pivotal connection to different positions in the said slot, and means for preventing its accidental change from any desired position therein.

37. In a flying machine, the combination with a car having a keelson, of a cradle comprising a core piece extending from front to rear, a series of curved ribs issuing outwardly and upwardly from the said core piece to which they are integrally secured, a gunwale rigidly connecting the extremities of said ribs, two pillars connected by cross rails yoking the rear of the opposite branches of the gunwale together and guides attached to the underside of said core piece to slidably engage with the said keelson.

38. In a flying machine, the combination with a frame having longitudinal stringers, the car supported from the central stringer having a keelson thereon, and hangers in the car, of a cradle within the car, levers connecting the same with the hangers and permitting back and forward movement of the same, and metal clasps on the cradle engaging the keelson of the car.

39. In a flying machine, a propelling mechanism formed with a series of symmetrically disposed units, each said unit comprising a rotatably mounted propeller shaft, radiating arms on said shaft, connecting tubes at the extremities of said arms having wings thereon, disks eccentrically pivoted to the shaft, a rotatable rider on each disk having arms with end-stops for limiting the angular position of the wings to the longitudinal line of the machine, a lever rigidly secured to each disk and means under the control of the operator for moving all the levers to simultaneously, and coincidentally, adjust the angle of incidence in the planes of the full complement of wings.

40. In a flying machine, the combination with a pair of propeller wings, revoluble in the vertical and longitudinal plane of the machine, of means for retaining any desired acclivity or declivity in the position of the plane of the wings, said means comprising the carrying arms, radial from the driving shaft, controlling arms radial from an axis of rotation in the same plane of movement but located apart from that of the said driving shaft, an adjustable disk coupling the axis of the said driving shaft and the axis of the controlling arms together, stop levers coupling the wing trunnions and the flange-headed stop pins together, the said mechanism assembled adapted to form, substantially, a jointed parallelogram, the shorter sides of which have their forward or rearward inclination constantly subject to manual adjustment.

41. In a flying machine propelling mechanism revoluble in a plane longitudinal and approximately vertical, the combination of eccentric disks carrying control arms, stop levers coupling the control arms with the propeller wing pivots in parallel with the throw of said disks, a similar combination at each end of a pair of propeller wings, the eccentricity of the respective disks differing ninety degrees from each other.

42. In a flying machine, the combination with a pair of propeller wings revoluble in the vertical and longitudinal plane of the machine, of means for supporting the same in constant parallelism, and means permitting the rear of one or both of the said wings to dip when relieved of upward atmospheric resistance.

43. In a flying machine having propelling wings and a pendulous, smooth, bifacial convex car body, a pendulous cradle interior to same, upright, oscillatable back and front levers sustaining said cradle, pivots sustaining the levers, the combination of a locking hand lever secured integrally to the protruding end of said front lever pivot, said hand lever being bent to cause the handle part to move in the longitudinally central and vertical plane of said cradle and car, a hanger brace, a locking quadrant, having a row of stop notches, rigidly secured to said hanger brace, a spring actuated locking device on said hand lever to engage said stop notches subject to the operator's adjustment, and means connected with said lever for simultaneously changing the angle of the machine's complement of said wings at option, as specified.

44. In a flying machine, the combination of a frame having a central, longitudinal stringer supported with freedom of oscillation, and a transversely pendulous car connected to the central stringer and having a keelson thereon, a cradle interior to same, a single front suspensory lever for said cradle, a double suspensory lever for the back thereof, flanges on the bottom of said cradle adapted to slidably engage the keelson on said car, hangers attached to underside of said central stringer above the relative positions of said suspensory levers, a pivotal connection between said hangers, lower terminals and said suspensory levers, front and rear guiding vanes, and controlling means for the front and rear vanes connected to and operated by the suspensory levers.

45. A flying machine having front and rear pivoted guiding vanes and a pendulous cradle, means for tilting the vanes, and connecting means extending between the cradle and the tilting means adapted to cause tilting of the same on movement of the cradle, the tilting of the rear guide vane being of different degree from those of the front, and of opposing inclination.

46. In a flying machine, the combination with a pair of tiltably mounted guiding vanes extending on opposite sides of the central line of the machine, and having the greater portion to the rear of the pivoting axis, of a circuitous sliding plate having a transversely-extending beam connected to the same, the extremities of which are connected to the front parts of the vanes, and means for actuating the sliding plate.

47. A flying machine having a transversely pendulous car with a longitudinally pendulous cradle therein, the cradle being completely inclosed by the car.

48. In a flying machine, the combination with the car and suspensory levers pivoted to the same, of a cradle pivoted at one end to one of the levers, and having a plate with an arcuate slot in it at the opposite end, means for pivoting the lever in the arcuate slot, and means for shifting the pivotal connection to any desired forward or backward position in said arcuate slot.

49. In a flying machine, the combination with the air-deflecting vane surfaces, of a universally-movable, load-carrying mechanism adapted to automatically adjust the angle of the vane surfaces, and means for independently adjusting the said vane surfaces without interfering with said automatic action.

50. In a flying machine, the combination with a car of a vertical rudder forming the posterior part thereof, and being flexible from side to side of the vertical central plane of said car, a vertical post integral with said car, a series of rearward extending, laterally tapering elastic blades having their bases secured to said post, a vertical shaft rotatably socketed at its upper and lower extremities and positioned forward and adjacent to said vertical post, a series of disk-sectors fixed rigidly upon said shaft, ligaments encircling the peripheries of said sectors and secured to the end of the rudder blades, a series of cross-ties tensionally connecting each pair of opposing ligaments and the blade intermediate of said pair, and an enveloping fabric for the rudder blades and ligaments.

51. In a flying machine, the combination with a central draft, overhead steering cord, of an added section of cord spliced into the main line on each branch of said cord system, and a pair of additional pulleys so positioned as to enable the resultant strain of the two cord branches to intersect the front lever's supporting pivot center.

52. In a flying machine, having elongated rectangular wings transversely extended, the combination of wings and vanes having an axial core placed forward of the line of middle width, two trunnion journals extended therefrom, a serrated, rigid, rounded front edge to said wing, a flexible posterior part thereto, the margin bendable elastically upward when in operation but springing slightly concave on under side when freed from stress, both upper and lower surfaces being covered with smooth, preferably silken fabric, a thin posterior edging of non-frayable material (as celluloid), strong flanking pieces, larger than the cross section of said wing, having inward braces conjoining with said wing core, a plurality of fin-like struts on upper and lower sides of said wing, the central one having the greatest projection, flat wire diagonally stretched over said struts between said flanking pieces, and secured for the purpose specified.

53. In a flying machine having frame and shafting members of appreciable bulk athwart said flying machine's line of forward progression, the combination of light vane-like shroudings inclosing such air-resisting members, each said covering comprising a frame-work of flat wooden ribs loosely fitted upon said thwartwise member, a tie-strip near the forward points of said ribs uniting said series in rigid alinement, a semi-rigid facing, as split ratan, alternating from rib point to tie strip and repeatingly continued over the series to form a firm, serrated front edge, a posterior portion to said rib series being longer, straighter, heavier and more pointed than the portion anterior to said supporting axial member, an enveloping frictionless fabric drawn tensely and entirely over said framework and secured for the purpose specified.

54. In a flying machine the combination with the transverse shafting and framing thereof, of a loosely rotatable envelop for said transverse members, streamline contours to said envelop in profile, said envelop being unbalanced pivotally on its support and having its preponderating area normally rearward.

55. In a flying machine, an air-deflecting or propelling vane, having a longitudinal core with a series of transverse rib struts thereon with fabric stretched over and under the same, the front edge of the vane being serrated between the rib struts, and the rear portion having the enveloping fabric taperingly convergent.

56. In a flying machine, the combination with the frame, of air cushions on the underside thereof and means operated by the air currents against the machine for inflating or collapsing the said cushions.

57. The combination in a flying machine of a wing, vane or plane and a series of angular serrations constituting the forward edge of said wing, vane or plane.

58. A flying machine having a pair of separately tiltable guide planes extended across the extreme front and a similar pair across the extreme rear thereof and automatic means specified for simultaneously tilting all said planes, the front and rear pairs to different degrees of inclination to each other, and in opposition, for longitudinal stability.

59. In a flying machine as described, having a central and marginal stringers and propelling mechanism, the combination of a pair of guiding planes extended across and connected to the said frame members at the extreme front and rear of the machine and means for automatically deflecting the said planes of one side of the machine in parallel and the planes of the other side in parallel but the said planes on opposite sides of the machine in relatively reverse inclinations for lateral stability.

In witness whereof I have hereunto set my hand in the presence of two witnesses.

JAMES EDWARD FRASER.

Witnesses:
F. C. WESTRY,
ALFRED HALL.